Nov. 9, 1943.  L. NEUMANN  2,333,811
WELDING ROD AND METHOD OF MAKING THE SAME
Filed Nov. 14, 1941
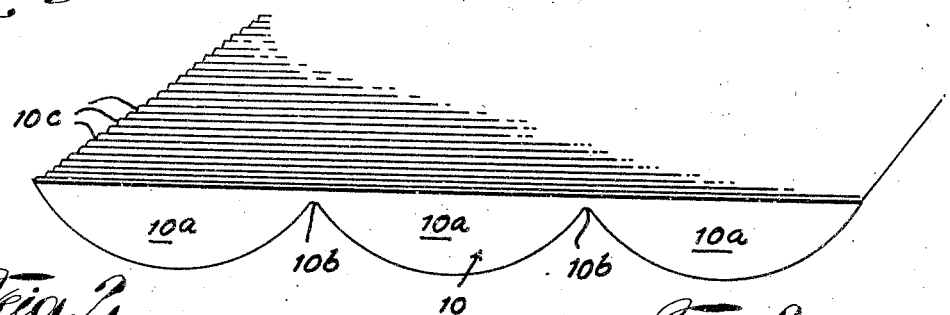
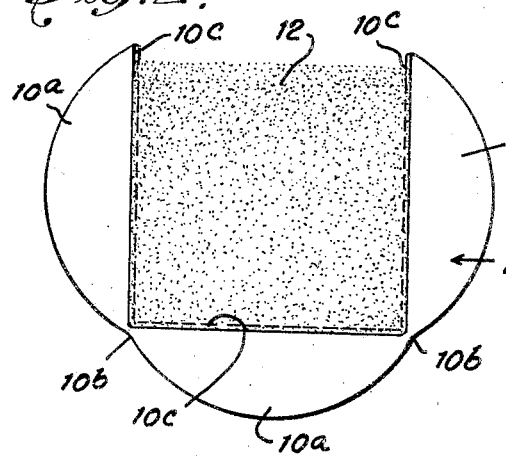
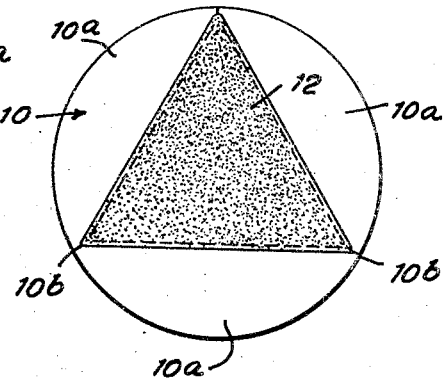
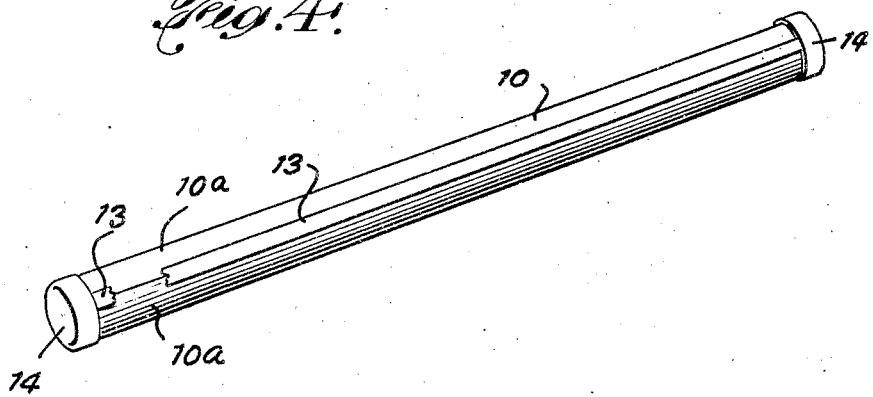
INVENTOR
Leopold Neumann
BY
Emery, Varney, Whittemore + Dix
ATTORNEYS Patented Nov. 9, 1943

2,333,811

UNITED STATES PATENT OFFICE 2,333,811

WELDING ROD AND METHOD OF MAKING THE SAME

Leopold Neumann, New York, N. Y., assignor to Multiprises, Inc., New York, N. Y., a corporation of New York Application November 14, 1941, Serial No. 419,134

8 Claims. (Cl. 219—8)

This invention relates to metal welding and has for an object the provision of improvements in welding rods and their manufacture. The invention is particularly applicable to aluminum welding and will be described with special reference to this field, but it may have wider applications in whole or in part.

Aluminum oxidizes very rapidly even at normal atmospheric temperatures, and all attempts to weld it must provide for the elimination of surface oxide. The melting point of aluminum oxide is very high, much above the melting point of aluminum metal, hence simple heating which may be effective for welding some other metals is not effective for welding aluminum. Nor is super heating effective, for aluminum will vaporize before its oxide is melted or softened sufficiently to be removed. However, a flux is known which will float the oxide away from the aluminum surface to leave it clean enough for welding. Also a welding composition is known which, in connection with the flux, is suitable for welding aluminum. The present invention is not concerned with welding compositions and fluxes as such; it assumes that these are procurable, and provides improvements in their combination and use.

The aluminum flux referred to, though very effective when fresh, deteriorates rapidly when exposed to atmospheric air. It absorbs moisture which, even in small amounts, is harmful and, in large amounts, is intolerable. This flux in natural condition is a powder and must be mixed with adhesive and waterproofing substances to allow it to be applied to welding rods in the usual way as an exterior coating. The rod is dipped several times in the coating material, as in candle making, and extruded to form a covering of the desired thickness. The preferred composite welding rod has a cross-sectional area composed of about 60% aluminum alloy and about 40% flux by volume.

But while the adhesive and waterproofing substances are not prohibitive in welding operations, neither are they desirable. They have a slightly detrimental effect and moreover add to the cost of the electrodes. Care must be exercised in handling the electrodes to avoid breaking the flux-envelope, and because the coating is not durable over long storage periods, it is usual to keep the rods in special air-tight containers.

According to the present invention these difficulties are avoided by enclosing and protecting the flux in pure form by the welding rod itself. It is, of course, known that soldering and welding rods have been made in which the flux was placed as a core within the metal tube. But in such cases the flux was flowable like a liquid and the metal was very soft and plastic. If an aluminum alloy strip of sufficient thickness to form the proper proportion of metal for a common welding rod of about $\frac{1}{8}$" diameter is folded into a circle, it will crack or split at places, hence will not form a satisfactory welding rod.

I have discovered that if the alloy strip is longitudinally divided into thick and thin elements, it can be folded without breakage, and that when the powdered flux is sealed up in such fluted tubes it is not liable to deterioration or injury during storage or handling, and does not lose its cross-sectional uniformity during use. Hence there is no loss of even short lengths of the rods either before or during use—except, of course, the short ends which must be gripped in the welding electrodes or rod holders.

In order to provide a clearer understanding of the objects and advantages of the invention, a specific embodiment thereof will be described in connection with the accompanying drawing, wherein:

Fig. 1 is an isometric end view of a fluted strip which is to form the metallic portion of the welding rod;

Fig. 2 is an end view of the same strip folded to form a trough into which the powdered flux has been poured;

Fig. 3 is an end view of the same after the flux has been confined by further folding; and Fig. 4 is a side view of a finished rod or stick.

Referring to the drawing, a longitudinal welding alloy strip 10, which may be of indefinite length, is formed by known rolling operations. It is possible to form it by flattening and shaping the usual size of alloy rod, such as is coated with flux, without materially changing its cross sectional area, to the end that a standard size alloy rod may be converted into a standard size welding rod with the usual proportion of metal to flux. The strip 10 is formed with longitudinal flutes 10a separated by valleys or thin portions 10b. The flutes may be formed on one or both sides but are shown as being formed on only one side, that being the outside, considered with reference to the finished rod. The enlarged portions 10a are sufficiently heavy to provide the bulk of metal required in the final cross section and the diminished portions 10b are sufficiently thin to be bent up as required without cracking or breaking. In the particular form illustrated there are three enlarged portions which together form a circle exteriorly when bent up into triangular section, as shown in Fig. 3. The parts are so proportioned that when folded to final shape the metal alloy will compose 60% of the cross-sectional area and the hollow triangular space which is filled with flux will compose 40% of the cross-sectional area.

The strip is partially folded up, as shown in Fig. 2, to form a trough which is rectangular or square in cross section. Into this trough, which is kept upright, there is deposited the powdered flux 12. As shown, this approximately fills the trough.

The strip is then folded further, as shown in Fig. 3, to form a triangle interiorly and close the space to confine the flux. The outer surface is then a circle. The strip shaping and folding operations up to this point may be performed by rolls. If desired, the closed strip may now be given a pass through a drawing die to tighten the seal and remove surface irregularities so as to impart a perfectly round shape of accurate size. During the closing operation the interior space is greatly reduced, to half the square size in this example, and the powdered flux correspondingly compressed.

The compression holds the material in position to maintain all cross sections uniform even in use with heat and vibration. To assist in keeping the flux in position the interior surface may be roughened, as shown at 10c in Fig. 1. The rough elements here run transversely and may be formed by a roll with transverse rib or blades. A knurled roller may be used to form crossing ribs like those of a coarse file. The ribs may be made deeper than a mere roughening to form pronounced projections, if desired, and some of these may run vertically to further restrict the interior space when the strip is folded into closed condition.

While the abutting or seam edges of the tubular rod are pressed tightly together it is desired to provide full assurance of a perfect seal which will be effective to protect the flux from moisture for long periods of time. To this end the longitudinal seam may be protected by a strip of gummed cellulose material 13, generally known as "Scotch" tape, and the ends may be closed by tips 14 which may be formed as by dipping in lacquer, sealing wax, enamel or other suitable material. Preferably, a material which will combine with the longitudinal strip 13, such as a quick drying cellulose solution which will form a relatively heavy continuous tough layer, is used.

When the welding rod is to be used, the end sheaths and longitudinal sealing strip are readily peeled off. If then consists only of the welding composition and the flux, no adhesive for holding the flux being used. During welding the flux does not flow or creep along the rod, hence all cross sectional portions are the same, even to the ends. In such a rod the flux is fresh and unimpaired and the problem of consistently making good welds is greatly simplified.

I claim:

1. The method of making a welding rod which comprises, providing a fluted strip having a plurality of approximately equal arcuate longitudinal external thick portions with a radius of curvature to form a circle when folded together and intervening thin portions, folding the fluted strip along the thin portions into a square trough, depositing flux in the trough to fill it, and closing the strip to form a triangular interior and a circular exterior, the flux being compressed in the folding operation.

2. The method of making a welding rod which comprises, providing a fluted strip having a plurality of approximately equal arcuate longitudinal external thick portions with a radius of curvature to form a circle when folded together and intervening thin portions, the interior surface of the strip being roughened behind the thick portions, folding the fluted strip along the thin portions into a square trough, filling the trough with flux, closing the strip to form a triangular interior and a circular exterior, the flux being compressed in the folding operation, and sealing the longitudinal seam and ends of the rods.

3. The method of making a welding rod which comprises, forming a strip with longitudinal flutes on the outside and roughening comprising transverse ribs on the inside, the thick portions of the flutes being arcuate and approximately equal to form a circle when folded up and being separated by thin portions, folding the fluted strip along the thin portions into a square trough, filling the trough with powdered flux, closing the strip to form a triangular interior and a circular exterior, the flux being compressed in the folding operation, closing the longitudinal seam with a strip of adherent sheet material, and sealing the ends of each unit length of rod material.

4. A welding rod comprising a longitudinally folded metal casing including approximately equal thickened portions and intermediate thin portions and a longitudinal seam, and a compressed flux core.

5. A welding rod comprising a longitudinally folded metal casing including approximately equal thickened portions and intermediate thin portions and a longitudinal seam, the exterior of the casing being circular in section, and a compressed flux powder core.

6. A welding rod comprising a longitudinally folded metal casing including approximately equal thickened portions and intermediate thin portions and a longitudinal seam, the exterior of the casing being circular and the interior being polygonal, and a flux powder core filling the interior space.

7. A welding rod comprising a longitudinally folded metal casing having a seam on one side, the casing being circular exteriorly and triangular interiorly, a compressed flux powder core, a longitudinal sealing strip over said seam, and coatings sealing the ends of the rod.

8. A welding rod for aluminum comprising a longitudinally folded aluminum alloy casing having a seam on one side, the casing being circular exteriorly and triangular interiorly and constituting about 60% of the total cross-sectional area of the rod, the casing also being roughened on its interior surface, an aluminum flux powder core filling the interior space of the casing and constituting about 40% of the total cross-sectional area of the rod, the core powder being compressed to about half its free volume, a longitudinal sealing strip of cellulose material removably glued over said seam, and removable dipped coatings sealing the ends of the rod.

LEOPOLD NEUMANN.